June 13, 1944.   W. F. BOLDT   2,351,098
HYDRAULIC ACTUATING SYSTEM
Filed Jan. 6, 1943   2 Sheets-Sheet 1
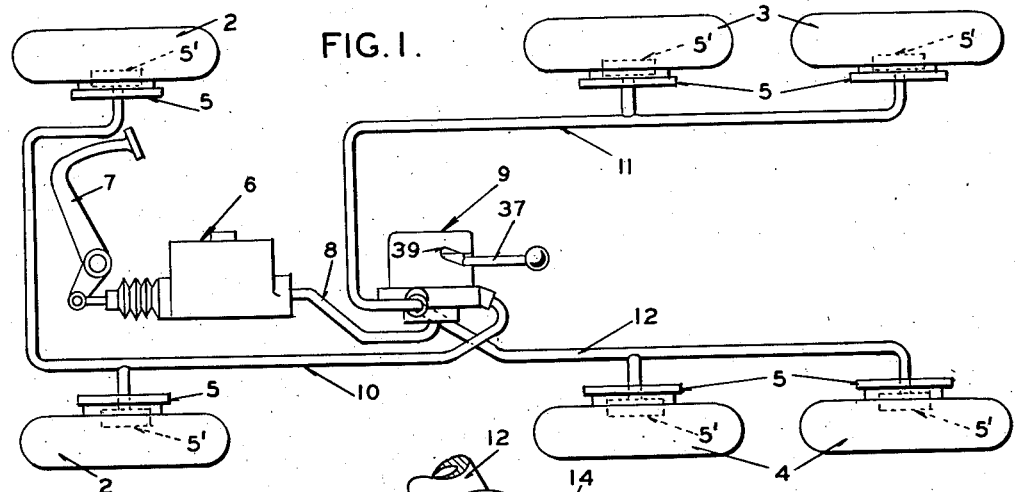
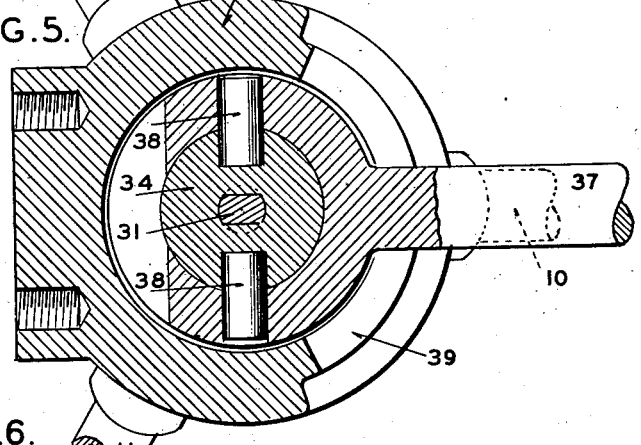
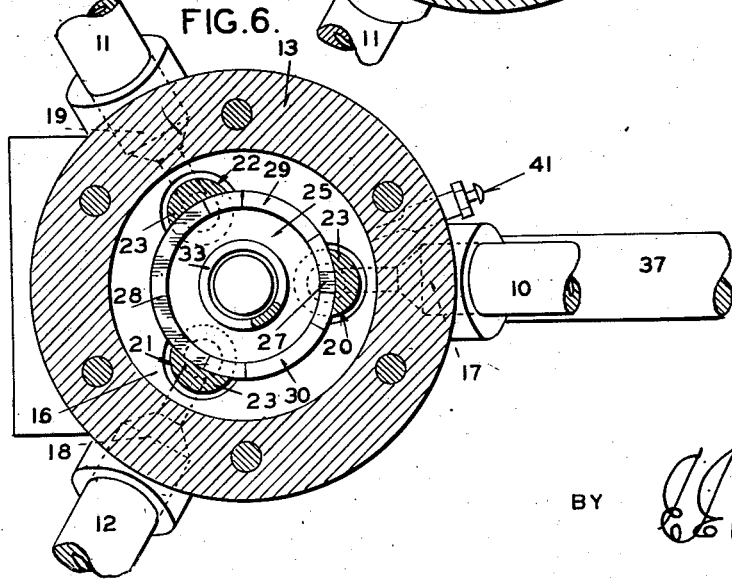
INVENTOR
W.F. BOLDT
BY
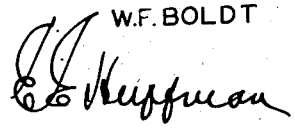
ATTORNEY June 13, 1944. W. F. BOLDT 2,351,098
HYDRAULIC ACTUATING SYSTEM
Filed Jan. 6, 1943 2 Sheets—Sheet 2
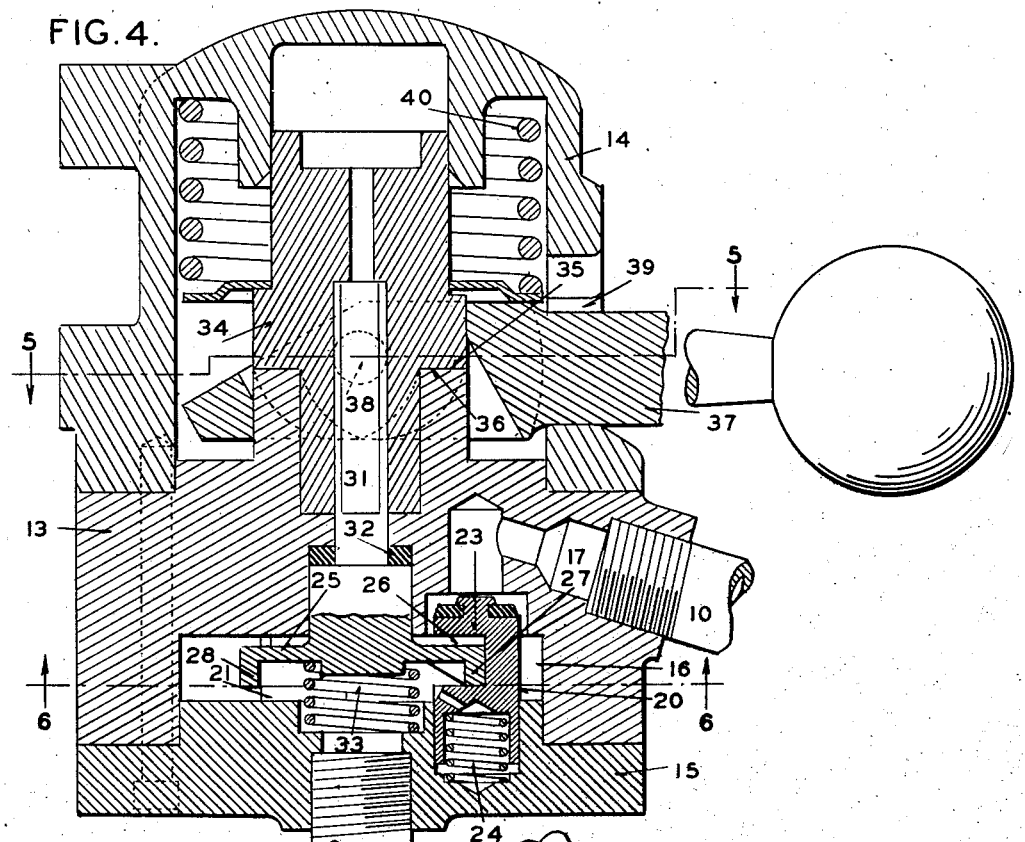
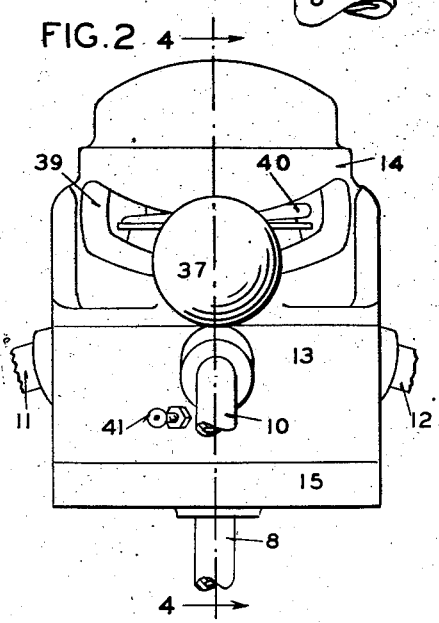
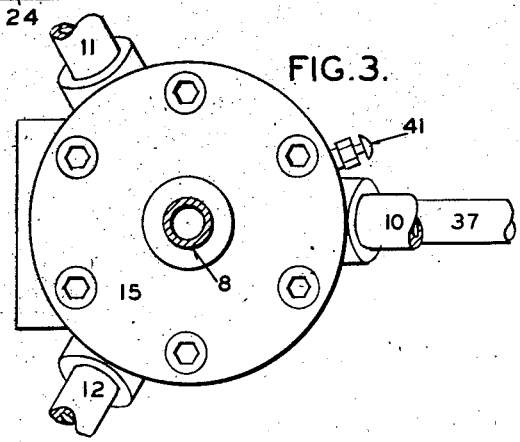
INVENTOR
W. F. BOLDT
BY
ATTORNEY Patented June 13, 1944

2,351,098

UNITED STATES PATENT OFFICE 2,351,098

HYDRAULIC ACTUATING SYSTEM

Werner F. Boldt, Clayton, Mo., assignor to Wagner Electric Corporation, St. Louis, Mo., a corporation of Delaware Application January 6, 1943, Serial No. 471,410

11 Claims. (Cl. 188—152)

My invention relates to fluid pressure actuating systems and more particularly to a hydraulic system for actuating the brakes on a vehicle in a particular manner.

One of the objects of my invention is to produce a fluid pressure actuating system including an improved selector valve mechanism which will permit the simultaneous actuation of a plurality of devices or the disabling of one device in conjunction with the selective disabling of two other devices.

Another object of my invention is to produce a simple and compact selector valve mechanism which will enable an operator to obtain the control above referred to and which can be easily and conveniently installed in the fluid pressure system.

Other objects of my invention will become apparent from the following description taken in connection with the accompanying drawings in which Figure 1 is a schematic view of a fluid pressure brake actuating system embodying my invention; Figure 2 is a front view of the valve mechanism; Figure 3 is a bottom view of said valve mechanism; Figure 4 is a sectional view taken on the line 4—4 of Figure 2; and Figures 5 and 6 are sectional views taken on the lines 5—5 and 6—6, respectively, of Figure 4.

Referring to the drawings in detail, my invention is shown embodied in a hydraulic actuating system for the brakes of a motor vehicle but such is by way of example only as it can be embodied in any fluid system where the results obtained are desirable. In Figure 1 there is schematically shown the dirigible front wheels 2 of said vehicle, the right rear driving wheels 3, and the left rear driving wheels 4. All of these wheels are provided with brake assemblies 5 which are actuated by the usual fluid motors 5'. The fluid medium employed to control the brakes is a liquid and the source of pressure comprises the well-known master cylinder device 6 operated by a pedal 7. The outlet of the master cylinder is connected by a conduit 8 with my novel selector control valve mechanism generally indicated by the numeral 9. From this control valve mechanism a conduit 10 leads to the fluid motors on two front wheels to operate the brake assemblies 5 thereof. There is also a conduit 11 which leads to the fluid motors of the brakes on the right rear wheels and a conduit 12 which leads to the fluid motors of the brakes on the left rear wheels.

As shown in detail in Figures 2, 3, 4, 5, and 6, the control valve mechanism 9 comprises a main body member 13 to which is fitted a cap 14 and a bottom plate member 15. The body member and plate member are so formed as to provide a chamber 16 therebetween to which is connected conduit 8 coming from the outlet of the master cylinder device. This chamber 16 has three outlet passages 17, 18, and 19 (see Figure 6) arranged 180 degrees apart in the body member 13. The outlet passage 17 is connected with conduit 10 leading to the front brakes and passages 18 and 19 are connected to conduits 12 and 11, respectively, leading to the rear brakes. Passages 17, 18, and 19 have associated therewith shutoff valves 20, 21 and 22, respectively.

As best shown in Figure 4, each of these valves comprises a plunger 23 slidably mounted in the bottom plate 15. The plungers are spaced 180 degrees apart with their axes parallel with the vertical axis of the body member. A spring 24 biases each plunger toward seated or closed position. The valves are controlled by a rotatable disc cam 25 mounted in the body member 13 with its peripheral portion being received in cross notches 26 in the valve plungers so that the cam surfaces which are formed as flanges on the disc may cause the plungers to be reciprocated. As best shown in Figures 4 and 6, the disc cam has a short high portion 27 for cooperation with the plunger of valve 20 and a long high portion 28 extending over approximately 120 degrees for cooperation with the plungers of valves 21 and 22. Between the high portion 27 and high portion 28 are low portions 29 and 30.

When the disc is in its normally inoperative position, as shown in the figures, the high portions thereof will be so positioned that all the plungers of the valves will be held in unseated position. If the disc should be turned in a clockwise direction, as viewed in Figure 6, the plungers of valves 20 and 21 will be moved to valve closed position by the action of springs 24 due to the fact that the low portions 29 and 30 of the cam are moved into the slots of the plungers. If the disc should be moved in a counter-clockwise direction, then the plungers of valves 20 and 22 will be moved to closed positions by their springs due to the fact that the low portions 29 and 30 are moved into the slots of said plungers.

The disc is provided with a stem 31 which extends through the body member 13 into the cap 14 and in order to seal this stem, there is provided a sealing washer 32 which is compressed by a spring 33 acting on the disc and positioned between said disc and the bottom plate. The inner end of the stem has a rectangular crosssection and is received in a rectangular opening in a member 34. This member is journaled in cap 14 and the body member 13 for both rotative and axial movement. The end of the member 34 adjacent the body member 13 is formed with a cam surface 35 for cooperation with a complementary cam surface 36 carried by the body member (see Figure 4). The member 34 is adapted to be turned by a lever or handle 37 which is pivoted to said member by pins 38 (Figure 5), said handle projecting through a slot 39 in the wall of the cap in order to be accessible from the exterior. A spring 40 positioned in the cap acts on the member 34 to hold the cooperating cam surfaces 35 and 36 in engagement with each other and also to bias the handle into engagement with the lower edge of the slot through which it extends.

When the handle is in the central part of the slot, the cam surfaces 35 and 36 on member 34 and body member 13 will be in complementary engagement and the disc 25 will have the position shown in Figure 6 wherein all the shut-off valves are in open position. If the handle should be moved to the right, as viewed in Figure 2, the member 34 will be rotated and also the disc 25. This will position the disc so that valves 20 and 21 become closed, valve 22 remaining open. The cam surfaces 35 and 36 will cause member 34 to move upwardly and compress spring 40. If the operator, after moving the handle to the left, should release said handle, spring 40 acting through cam surfaces 35 and 36 will return the handle to its central position. The disc now returns to the position wherein all the shut-off valves will again be held open. If the lever should be turned to the left, as viewed in Figure 2, the disc will be so rotated that the shut-off valves 20 and 22 will be permitted to become closed, shut-off valve 21 remaining open. Spring 40 will again be compressed by member 34 being moved upwardly by the action of the cam surfaces 35 and 36. When the operator's hand is released from the handle, the handle will snap back to its central position under the action of spring 40.

A bleeder valve 41 is associated with chamber 16 so that air can be removed from the system when filling it with liquid or at any other time.

From the foregoing description it is apparent that when it is desired to employ the brakes to assist in steering, such can be accomplished solely through controlling the valve mechanism 9. By turning handle 37 to the left, as viewed from the front of the valve mechanism, the master cylinder device will be cut off from the front wheel brake actuating fluid motors and the brake actuating fluid motors of the right rear wheel brakes. When the master cylinder is now operated, only the left rear brakes will be applied. Thus the operator of the vehicle will be aided by the braking in turning the vehicle to the left. Steering will be greatly facilitated, particularly in the event the vehicle is on icy or very slippery ground where the dirigible wheels, although turned, will not cause efficient turning of the vehicle. Also, when the driving wheels are braked to aid steering, the dirigible wheels are always free to roll. If it should be desired to employ the brakes in steering to the right, the handle need only be moved to the right end of the slot. This will cause the front wheel brakes and the left rear brakes to be cut off from the master cylinder device and when said device is operated only the brakes on the right rear wheels will be applied.

No manual effort need be employed to bring the handle back to its normally inoperative position as this will be automatically accomplished by spring 40 whenever the hand is removed from the handle. When the handle is in its central position, the control valve mechanism will not interfere in any way with the application of all the brakes on both the front and rear wheels in the usual manner.

From the foregoing it is seen that there has been produced a selector valve mechanism which will so control a braking system employed to actuate brakes on both dirigible and non-dirigible wheels in such a manner that the brakes on the rear wheels only may be employed to aid in steering. When these rear wheel brakes are so employed, the dirigible wheel brakes will always be shut off.

The valve is primarily designed for use on vehicles having dirigible wheels which are normally braked but it can be employed in the braking system of vehicles where there are no dirigible wheels or the dirigible wheels have no brakes. This would be accomplished by merely plugging passage 17. Conduit 11 would then extend to all the brakes on one side of the vehicle and conduit 12 to all the brakes on the other side of the vehicle.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, three fluid motors for actuating devices, conduit means connecting the source with each fluid motor, three normally open shut-off valves associated with the conduit means and each comprising an element having reciprocable movement only capable of cutting off communication between the source and a motor, and means comprising a single operable member movable relatively to all the elements for so controlling the closing of the elements of said shut-off valves that one valve together with either one of the other two valves can be selectively placed in closed condition.

2. In a fluid pressure system, a source of fluid pressure, three fluid motors for actuating devices, conduit means connecting the source with each fluid motor, three shut-off valves associated with the conduit means and each capable of cutting off communication between the source and a motor, means comprising a single rotatable member connected to control said valves and having a position where all the valves are open and other positions where one valve together with either one of the other two valves are selectively closed, and means comprising cam means and spring means for biasing said single member to its position where all the valves are open in the event the operator releases the member when it is in a position closing certain valves.

3. In a fluid pressure system, a source of fluid pressure, three fluid motors for actuating devices, conduit means connecting the source with each fluid motor, three shut-off valves associated with the conduit means and each comprising a reciprocable element capable of cutting off communication between the source and a motor, a single member movable relatively to all the elements from a predetermined position to two other positions, and means connecting said member to control the three shut-off valves, said connecting means being so associated with the valves and member that all of said valves will be open when the member is in its predetermined position, two of said valves will be closed when the member is moved relatively to the elements from the predetermined position to one of said two other positions and one of said two valves and the third valve will be closed when the member is moved relatively to the elements from the predetermined position to the other of said two positions.

4. In a fluid pressure system, a source of fluid pressure, three fluid motors for actuating devices, conduit means connecting the source with each fluid motor, three shut-off valves associated with the conduit means and each comprising a reciprocable element capable of cutting off communication between the source and a motor, a single rotatable member having an axis parallel with the elements and rotatable relatively to all the elements in opposite directions from a central position, and means connecting said member to control the three shut-off valves, said connecting means being so associated with the valves and the single member that all of said valves will be open when the single member is in its central position, two of said valves will be closed when the member is moved in one direction from the central position and one of said two valves and the third valve will be closed when the member is moved in the opposite direction from said central position.

5. In a fluid pressure system, a source of fluid pressure, three fluid motors for actuating devices, conduit means connecting the source with each fluid motor, three shut-off valves associated with the conduit means and each including a reciprocable element capable of cutting off communication between the source and a motor, cam means for controlling said reciprocable elements of the valves, and a lever for operating the cam means, said lever having a predetermined position where said cam means causes all the valves to be open, another position where two of said valves are closed and a third position where one of said two valves and the third valve are closed.

6. In a fluid pressure system, a source of fluid pressure, three fluid motors for actuating devices, conduit means connecting the source with each fluid motor, three shut-off valves associated with the conduit means and each capable of cutting off communication between the source and a motor, cam means for controlling said valves, a lever for operating the cam means, said lever having a predetermined position where said cam means causes all the valves to be open, another position where two of said valves are closed and a third position where one of said two valves and the third valve are closed, and spring-operated means for automatically returning the lever to its predetermined position where the valves are all open in the event the operator releases the lever in either of its other positions.

7. In a fluid pressure system, a source of fluid pressure, three fluid motors for actuating devices, conduit means connecting the source with each fluid motor, three shut-off valves associated with the conduit means and each including a reciprocable element capable of cutting off communication between the source and a motor, a rotatable disc provided with cam surfaces for controlling the reciprocable elements of the valves, said cam surfaces being so arranged as to so coact with the valve elements as to cause all the valves to be open when the disc is in a predetermined position and to cause two valves to be closed when rotated in one direction therefrom and one of said two valves and the remaining third valve to be closed when rotated in the other direction, a lever connected to rotate the disc, and means for normally biasing the lever and disc to positions corresponding to the open condition of all the valves.

8. In a fluid pressure system, a source of fluid pressure, three fluid motors for actuating devices, conduit means connecting the source with each fluid motor, three shut-off valves associated with the conduit means and each capable of cutting off communication between the source and a motor, a rotatable disc provided with cam surfaces for controlling the valves, said cam surfaces being so arranged as to cause all the valves to be open when the disc is in a predetermined position and to cause two valves to be closed when rotated in one direction therefrom and one of said two valves and the remaining third valve to be closed when rotated in the other direction, a lever connected to rotate the disc, and means for normally biasing the lever and disc to positions corresponding to the open condition of all the valves, said last named means comprising a fixed cam, a member capable of axial movement and connected to rotate with the disc, said member having a cam surface cooperating with the fixed cam for moving the member axially when the disc is rotated from its predetermined position, and a spring acting on the member to resist axial movement thereof and by means of the cam to return the disc and lever to the positions where the valves are open.

9. In a fluid pressure system, two fluid motors for actuating devices, conduit means connecting the source with each fluid motor, two shut-off valves associated with the conduit means and each capable of cutting off communication between the source and a motor, rotatable cam means for controlling said valves, said cam means having cam surfaces for causing all the valves to be opened when it is in a predetermined position and for causing one valve to be closed when rotated in one direction therefrom and the other valve to be closed when rotated in the other direction, a lever, means connecting the lever to the cam means and comprising a member connected for rotation with the cam means but capable of axial movement, and means for biasing said lever and cam means in the positions corresponding to open position of both valves, said last named means comprising cams for causing axial movement of the member upon rotation of the valve controlling cam means from its predetermined position and a spring opposing axial movement of said member.

10. In a fluid pressure system, two fluid motors for actuating devices, conduit means connecting the source with each fluid motor, two shut-off valves associated with the conduit means and each having a valve element biased toward closed position in order to cut off communication between the source and a motor, said valve elements being provided with cross slots and mounted for parallel axial movement, a rotatable disc mounted on an axis parallel with the axis of the valve elements and having a peripheral portion received in said slots, said disc having cam surfaces for maintaining said valve elements open when the disc is in one position and for selectively permitting closing of said valve elements when the disc is rotated in opposite directions therefrom, and means for rotating said disc.

11. In a brake actuating system for a vehicle having a driving wheel on each side thereof and a dirigible wheel, brakes for the wheels, fluid pressure means for actuating all the brakes and comprising a source of fluid pressure, brake actuating motors and conduit means between the source and the motors, shut-off valves for preventing fluid pressure from operating each fluid motor and including a reciprocable valve element for each valve, cam means directly coacting with the valve elements for so controlling said valve elements of the shut-off valves that the brake for the dirigible wheel can be prevented from being actuated and selectively therewith either of the brakes of the driving wheel can be prevented from being actuated, and a lever for operating the cam means, said shut-off valves being open when the lever is in a predetermined position, the shut-off valve for the dirigible wheel brake and the shut-off valve for one of the driving wheel brakes being closed when the lever is moved in one direction from the predetermined position and the shut-off valve for the dirigible wheel brake and the shut-off valve for the other driving wheel brake being closed when the lever is moved in the other direction from said predetermined position.

WERNER F. BOLDT.